(12) United States Patent
Mulder (10) Patent No.: US 8,202,708 B2
(45) Date of Patent: Jun. 19, 2012

(54) METHOD OF PRODUCING A MASH EXTRACT AND AN APPARATUS FOR CARRYING OUT SUCH METHOD

(75) Inventor: Hendrikus Mulder, Uitgeest (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 481 days.

(21) Appl. No.: 12/301,451

(22) PCT Filed: May 16, 2007

(86) PCT No.: PCT/NL2007/050219
§ 371 (c)(1),
(2), (4) Date: May 6, 2009

(87) PCT Pub. No.: WO2007/136258
PCT Pub. Date: Nov. 29, 2007

(65) Prior Publication Data
US 2010/0035304 A1    Feb. 11, 2010

(30) Foreign Application Priority Data
May 19, 2006    (EP) .................................... 06114246

(51) Int. Cl.
*C12C 7/00*    (2006.01)
*C12C 7/06*    (2006.01)
(52) U.S. Cl. ............ 435/93; 435/291.5; 426/16; 426/29
(58) Field of Classification Search .................. 435/93, 435/291.5; 426/16, 29
See application file for complete search history.

(56) References Cited

U.S. PATENT DOCUMENTS
7,785,003 B2 * 8/2010 Blichmann .................. 374/208

FOREIGN PATENT DOCUMENTS
| DE | 1 65 124 | 11/1905 |
| DE | 5 16 547 | 1/1931 |
| DE | 6 57 114 | 3/1939 |
| DE | 10 58 958 | 6/1959 |
| DE | 12 94 308 | 5/1969 |

(Continued)

OTHER PUBLICATIONS

Winning Homebrew, Degrees Plato to Specific Gravity Conversion, http://www.winning-homebrew.com/Plato-to-specific-gravity.html, 1993.*

(Continued)

*Primary Examiner* — Rosanne Kosson
(74) *Attorney, Agent, or Firm* — Gilberto M. Villacorta; Sunit Talapatra; Foley & Lardner LLP

(57) ABSTRACT

One aspect of the invention concerns a method comprising:
a. mashing particulate, starch-containing and optionally malted raw materials with water;
b. heating the mash and enzymatically hydrolysing the starch;
c. passing the heat-treated mash across a first sieve for separation into a fermentable mash extract and wet spent grain;
d. transferring the wet spent grain, optionally after said wet spent grain has been subjected to a washing and sieving operation, to a first press and pressing said wet spent grain to obtain dewatered spent grain and additional fermentable mash extract.

The present method offers the advantages of (i) being very robust, (ii) enabling the production of high gravity mash extracts (iii) consuming very little electricity and (iv) achieving high extraction yields.

The invention also provides an apparatus for carrying out the aforementioned method.

17 Claims, 3 Drawing Sheets

FOREIGN PATENT DOCUMENTS

| | | |
|---|---|---|
| DE | 18 10 578 A1 | 10/1969 |
| DE | 16 42 735 A1 | 5/1971 |
| GB | 0 879 470 | 10/1961 |
| WO | WO 2005 059084 A1 * | 6/2005 |

OTHER PUBLICATIONS

Palmer, How to Brew, http://www.howtobrew.com/glossary.html, 1999.*

* cited by examiner

METHOD OF PRODUCING A MASH EXTRACT AND AN APPARATUS FOR CARRYING OUT SUCH METHOD

PRIOR RELATED APPLICATIONS

This application is a U.S. National Stage filing of PCT/NL2007/050219 filed May 16, 2007, which claims priority to European Patent application 06114246.9 filed May 19, 2006.

TECHNICAL FIELD OF THE INVENTION

The present invention is concerned with a method of producing a mash extract, especially a mash extract that is suitable for use in the production of a yeast fermented beverage such as beer. More particularly, the present invention provides a method comprising:
a. mashing particulate, starch-containing and optionally malted raw materials with water;
b. heating the mash and enzymatically hydrolysing the starch;
c. separating the heat-treated mash into mash extract and spent grain.

The invention also relates to an apparatus for carrying out such method.

BACKGROUND OF THE INVENTION

A mashing method as described above is disclosed in British patent GB-B 879 470. More specifically, said British patent describes a continuous method for the production of brewer's wort wherein heat-treated mash is introduced onto a first screen separator. The spent grains passing off the first screen separator drop into a first wash vessel where they are met and mixed with a very dilute wort originating from the screen separation of a grain slurry of a second wash vessel. The mixed slurry in the first wash vessel overflows onto a second screen separator. The dilute wort passing through the second screen separator is recirculated to the mashing step and the spent grains passing off the screen drop into the second wash-vessel where it is combined with a water stream. The slurry in second wash vessel overflows onto a third screen separator. The very dilute wort passing through the screen is pumped to the first wash vessel and the spent grains discharged from the screen go to spent grain disposal.

The method described in the British patent comprises continuously subjecting the solids fraction to counter-current extraction in a plurality of stages, each of which stages comprises reslurrying with wash effluent from a succeeding stage and mechanical separation of the coarse solids, to produce a substantially fully exhausted coarse solids waste. The examples of the British patent describe the results of three different production runs. The process wort streams produced in these runs had a specific gravity (S.G.) in the range of 1.04117 to 1.04484. These specific gravities equate to a gravity of about 10-11 degrees Plato (° P).

DE-B 516 547 describes an apparatus in which mash is separated into fermentable mash extract and wet spent grain by passing mash across a grid, followed by pressing the wet spent grains so obtained by means of a press piston against a sieve to obtain dewatered spent grain and additional fermentable mash extract.

DE-B 165 124 describes a process for continuous wort production that employs a sequence of three press chambers. The first and third chamber contain a screw press that is mounted in a conically shaped cylinder. This cylinder is perforated or comprises a mesh screen in order to allow liquid to run off. The second chamber is used for sparging the spent grain that exits from the first chamber before it is transferred into the third chamber. Sparging water is utilized in the process in a countercurrent fashion. In the process disclosed in the German patent sieving and pressing occur essentially simultaneous.

U.S. Pat. No. 3,157,583 describes a process for the production of clarified malt extract wherein mash is passed through a first vibrating screen to remove most of the fibrous and husk material and wherein the removed fibrous and husk material is transferred to another vibrating screen where it is washed with sparging water.

SUMMARY OF THE INVENTION

The inventors have developed a novel process for the production of a fermentable mash extract that offers the advantages of (i) being very robust, (ii) enabling the production of high gravity mash extracts (iii) consuming very little electricity and (iv) achieving high extraction yields.

The present method is characterised in that it employs one or more sieve-press combinations to produce the fermentable mash extract. More particularly, the present method is characterised in that it comprises the following steps:
a. mashing particulate, starch-containing and optionally malted raw materials with water;
b. heating the mash and enzymatically hydrolysing the starch;
c. passing the heat-treated mash across a first sieve for separation into a fermentable mash extract and wet spent grain;
d. transferring the wet spent grain, optionally after said wet spent grain has been subjected to a washing and sieving operation, to a first press and pressing said wet spent grain to obtain dewatered spent grain and additional fermentable mash extract.

The one or more sieve-press combinations that are employed in the present method can suitably be operated in a continuous fashion. The sieves (or screens) can be operated at a high throughput to achieve a first solid-liquid separation. Since, the solids fraction retained on the sieves is typically much smaller than the permeating liquid fraction, presses can be operated at a much lower throughput to remove almost all of the liquid that is still contained in the solids fraction. The present method combines the ability of sieves to effectively separate low solids streams with the ability of presses to effectively separate high solids streams. Thus, the use of sieve-press combinations in the present method offers the advantage of high throughput and high efficiency.

DETAILED DESCRIPTION OF THE INVENTION

Accordingly, one aspect of the invention concerns a method comprising:

a. mashing particulate, starch-containing and optionally malted raw materials with water;
b. heating the mash and enzymatically hydrolysing the starch;
c. passing the heat-treated mash across a first sieve for separation into a fermentable mash extract and wet spent grain; and
d. transferring the wet spent grain, optionally after said wet spent grain has been subjected to a washing and sieving operation, to a first press and pressing said wet spent grain to obtain dewatered spent grain and additional fermentable mash extract.

The term "mashing" as used herein refers to the admixing of starch-containing raw material, water and enzymes capable of hydrolysing starch. The latter enzymes may be provided by e.g. malt or by another enzyme source, e.g. a commercially available enzyme preparation containing starch degrading enzymes such as those found in malt, notably α-amylase, β-amylase and/or glucoamylase. Preferably, the enzymes are employed in the present method in the form of malt.

It should be understood that wherever reference is made to a first sieve, a second sieve, a third sieve etc., such a first, second or third sieve may actually comprises two or more sieving devices that together perform the action of separating solids and liquid on the basis of particle size. These two or more sieving devices may be operated in parallel and/or in series. For instance, it may be advantageous to employ a sieve that consists of a stack of sieving devices, wherein the pore size of the sieve devices decreases in the downstream direction. Likewise, it can be advantageous to employ a sequence of presses, wherein the pressure applied increases in the downstream direction. It can also be advantageous to operate a number of sieving devices or presses in parallel, in particular if the process is operated in a continuous fashion. When run in parallel well below full capacity, failure or shutdown of one separating device does not necessitate interruption of the mash extraction process, meaning that the process can be operated uninterruptedly for prolonged periods of time.

Just like the sieves and presses, also the mixing vessels employed in the present process may actually consist of two or more mixing devices that are operated in series or in parallel.

A particularly advantageous embodiment of the present process comprises the additional steps of:
e. transferring the dewatered spent grain into a first mixing vessel and mixing it with sparging water to produce a slurry;
f. passing the slurry across a second sieve for separation into washed spent grain and wash water; and
g. transferring the washed spent grain to a second press and pressing said washed spent grain to obtain spent grain residue and rest water.

The use of an additional washing step in accordance with this embodiment makes it possible to further reduce extract losses.

In another preferred embodiment, prior to being transferred to the first press, the wet spent grain is subjected to a washing and sieving operation comprising:
transferring the wet spent grain into a washing vessel and mixing it with sparging water to produce a slurry;
passing the slurry across a further sieve for separation into wet spent grain and wash water.
This embodiment also offers the advantage that extract losses can be minimised very effectively.

Accordingly, a particularly preferred embodiment of the present invention relates to a method of producing a mash extract as defined herein before, wherein the method comprising the additional steps of:
e. transferring the dewatered spent grain into a first mixing vessel and mixing it with sparging water to produce a slurry;
f. passing the slurry across a second sieve for separation into washed spent grain and wash water; and
g. transferring the washed spent grain to a second press and pressing said washed spent grain to obtain spent grain residue and rest water
and/or wherein, prior to being transferred to the first press, the wet spent grain is subjected to a washing and sieving operation comprising:
transferring the wet spent grain into a washing vessel and mixing it with sparging water to produce a slurry;
passing the slurry across a further sieve for separation into wet spent grain and wash water;
and wherein at least a part of the wash water and/or the rest water is recirculated to the mashing step a. and/or combined with the heat-treated mash before it is passed across the first sieve.

According to yet another particularly preferred embodiment of the invention, at least a part of the wash water and/or the rest water obtained from the sieves and/or presses is recirculated to the mashing step a. and/or combined with the heat-treated mash before it is passed across the first sieve. Recirculation of the wash water and/or the rest water offers the important advantage that it enables high extraction yields without the need of using large quantities of water. At the same time, recirculation makes it possible to achieve such high extraction yields whilst producing a high gravity mash extract. Particularly good results in terms of efficiency and yield can be achieved if both the wash water and the rest water are fully recirculated, especially if they are recirculated to the mashing step a. Recirculation to the mashing step, as compared to recirculation to the heat treated mash, offers the advantage that starch hydrolysis can be achieved in a very efficient manner without using large quantities of water and/or long residence times.

In the mashing step, besides the recirculated aqueous stream from the second sieve/press combination, also recirculated aqueous streams generated downstream of the brewhouse, e.g. from yeast washing, may be employed.

Typically, in the present process the total amount of recirculated wash water and rest water constitutes at least 80 wt. %, preferably at least 90 wt. % of the total amount of water employed in the mashing step a. Most preferably, the wash water and rest water from the second sieve/press combination provides all the mashing liquid that is used in the mashing step.

In another preferred embodiment, steps c. to g. of the present method are carried out in a continuous fashion. Even more preferably, steps b. to g. and most preferably steps a. to g. are carried out in a continuous fashion. Due to its robustness, the present process is perfectly suited for being operated in a continuous fashion for prolonged periods of time.

The present method can suitably employ any type of sieve that is capable of retaining a substantial fraction of the solids contained in the mash or the spent grain slurry. Particularly suitable are vibrating sieves. A particularly suitable type of vibrating sieve is provided with free moving elements that, under the influence of vibrations, can bounce against the underside of the sieve. These free moving elements may suitably take the shape of balls or rings. An important advantage of this type of arrangement resides in the fact that it helps to prevent clogging of the sieve pores. A suitable sieving device is supplied by Allgaier Werke GmbH, Germany.

The pore size of the sieves employed in the present process is typically within the range of 20 μm to 1 mm. Preferably, the pore size of the sieves is within the range of 20-300 μm. More preferably, said pore size is within the range of 32-200 μm, most preferably within the range of 32-100 μm.

The present method can be operated using all kinds of presses. Preferably, the method employs presses that can be operated in a continuous fashion. Particularly suitable for use in the present method are screw presses. A suitable screw press is supplied by Ponndorf Maschinenfabrik GmbH, Germany or van Tongeren-Kennemer B.V., Beverwijk, the Netherlands.

According to a preferred embodiment, the presses are provided with a screen through which the additional fermentable mash extract is expressed and which retains the dewatered spent grain. Typically, the pore size of the screen is in the range of 20-800 μm. Preferably, the pore size of the screen is within the range of 20-300 μm. More preferably, said pore size is within the range of 32-200 μm, most preferably within the range of 32-150 μm.

The solids content of the dewatered spent grain obtained from the first press typically is at least 18 wt. %. Preferably, the solids content is at least 20 wt. %, more preferably at least 25 wt. %, even more preferably at least 30 wt. % and most preferably at least 35 wt. %. In particular if the present method employs a sequence of three or more sieve/press combinations, extract losses can be minimised very effectively. Accordingly, a preferred embodiment of the invention relates to a method as defined herein before, said method further comprising:

h. transferring the spent grain residue obtained from the second press into a second mixing vessel and mixing it with sparging water to produce a slurry;
i. passing the slurry across a third sieve for separation into extracted spent grain and dilute wash water;
j. transferring the extracted spent grain to a third press and pressing said extracted spent grain to obtain exhausted spent grain residue and dilute rest water; and
k. recirculating at least a part of the dilute wash water and/or the dilute rest water to the first mixing vessel.

The extract loss observed in the method is typically less than 15 wt. %. Extract losses of less than 10 wt. %, or even of less than 5 wt. % and most preferably of less than 3 wt. % can be achieved in the present method. Preferably, the latter efficiencies are realised across the complete wort production process, including both mash separation and trub separation. The amount of extract loss in the production of a mash extract may suitably be determined by measuring the extract concentration in the liquid phase of the spent grain by a standard method for determining extract concentrations in wort (E.g. density measurement by Anton Paar). Because of the absence of free liquid in dewatered spent grains, said spent grains are conveniently extracted with hot water, following which the exhausted spent grains are separated by filtration. The extract losses can be calculated from the measured extract level in the extraction liquid, taking into account the amount of water added.

In the present method the gravity of the fermentable mash extract obtained from the first separator typically exceeds 15° P. The advantages of the present method are particularly pronounced in case the gravity of the mash extract obtained from the first separator exceeds 18° P. More preferably the gravity of the mash extract exceeds 20° P, even more preferably it exceeds 25° P. In an especially preferred embodiment the gravity of the mash extract obtained from the first separator exceeds 28° P, most preferably it exceeds 30° P. These high gravities can be achieved with minimum extract losses in case the liquid fractions obtained from the sieves and the presses are all recirculated in an upstream direction. In a particularly preferred embodiment the present process does not produce any liquid waste streams, i.e. essentially all of the externally supplied water ends up in the mash extract, more preferably essentially all of it ends up in the fermented wort that is produced from the mash extract.

It is known in the brewing industry to produce a fermentable mash extract with high gravity by incorporating a significant amount of adjunct (e.g. syrup), especially after enzymatic hydrolysis of the starch contained in the mash. These adjuncts can provide high concentrations of fermentable sugars and consequently can be used to boost the gravity of the mash extract and wort. In the present method, high gravities can be achieved in the mash extract and wort without addition of fermentable sugars after enzymatic hydrolysis of the starch contained in the mash. Typically, less than 30 wt. %, preferably less than 10 wt. % of fermentable sugars in the mash extract and wort are derived from fermentable sugars added after hydrolysis of the starch contained in the mash. Most preferably, the mash extract and wort contain no fermentable sugars derived from fermentable sugars added after hydrolysis of the starch contained in the mash.

It is also known to increase the gravity of mash extracts or wort through evaporation. In the present process, preferably no concentration by means of evaporation is employed.

The present method is particularly suitable for producing a malt extract that can be used in the production of a yeast-fermented malt beverages such as beer, ale, malt liquor, porter and shandy, especially an alcoholic or non-alcoholic beer.

Accordingly, the present method preferably comprises the additional steps of:
converting the optionally hopped mashed extract into wort by heating said mash extract to a temperature of at least 60° C. for at least 15 minutes;
removing organic volatiles from the hot wort by reducing pressure and/or by stripping it with a gas or steam. In a particularly preferred embodiment, the gravity of the mash extract is maintained at 15° P or more, preferably at 18° P or more, more preferably at 20° P or more during these additional steps. Even more preferably said gravity is maintained at least 25° P, most preferably at least 30° P during these additional steps.

In the present process the mash extract is preferably converted into wort by heating said mash extract to 75-150° C. for 30 minutes up to 4 hours, preferably for 30 minutes up to 2 hours. The mash extract may suitably be converted into wort in a plug flow reactor.

The organic volatiles are removed from the hot wort by reducing pressure and/or by stripping it with a gas or steam. This is preferably done in a counter-current fashion. Most preferably, the organic volatiles are removed by stripping the hot wort with an inert gas or steam in a column equipped with a sieve plate geometry. Typically, the wort is maintained at a temperature of 95-110° C. when the organic volatiles are removed. The removal of the volatiles can suitably be achieved within 10 minutes, preferably it is achieved within 2 minutes.

The hot wort obtained after removal of the organic volatiles contains a sludge largely consisting of proteins, protein-tannin complexes and hops, often referred to as trub or hot break. The hot break or trub is removed in a separator. Examples of suitable separators include centrifuges, decanters, hydrocyclones, sedimenters, sieves and membrane filters. Preferably, the separator is selected from the group consisting of decanters, sedicanters and disc type centrifuges. Most preferably, the separator used is a disc type centrifuge. Typically, the separator is operated at a theoretical capacity factor value of at least 1,000 m², preferably of at least 2,500 m² and most preferably of at least 5,000 m² at a 1 m³/hr wort flow rate. Higher capacities can be scaled proportionally with the flow rate through the separator and the theoretical capacity factor.

The theoretical capacity factor (SIGMA value) of a centrifuge is calculated on the basis of the method described in "Solid-Liquid Separation", $2^{nd}$ edition, 1981, by Ladislav Svarovsky, Butterworth-Heineman. The factor is calculated according to the following relation between: the number of discs (n), the gravitational acceleration (g), the angular speed (ω), the angle of the discs with the vertical feed pipe (a), the inner radius of the discs package ($r_1$) and the outer radius of the discs package ($r_2$).

$$\Sigma = \frac{\varpi^2}{g} \frac{2}{3} \pi n (r_2^3 - r_1^3) \cot \alpha$$

According to a particularly preferred embodiment, following the removal of organic volatiles and hot break, the wort is diluted prior to being subjected to yeast fermentation. In the present method the wort is preferably diluted to a gravity within the range of 10-35° P, preferably to a gravity within the range of 10-30° P, prior to yeast fermentation. Typically, during dilution the gravity of wort is reduced by at least 2 degrees Plato, preferably by at least 4 degrees Plato and most preferably by at least 6 degrees Plato. Fermentation at high gravity, e.g. a gravity in excess of 35° P, is not practical as yeast growth and yeast metabolism are impaired at such high gravities. Dilution of the wort may occur before and/or after trub removal. Preferably, the wort is diluted after trub removal.

Dilution of the wort is achieved by combining the wort with an aqueous stream of lower gravity than said wort. It will be understood that such water stream may consist, for instance, of tap water or spring water. It is also within the scope of the present invention to employ aqueous effluent that has been obtained from a washing operation within the brewing process. In particular, it may be advantageous to combine the wort with an aqueous stream that is obtained from yeast washing.

Dilution of the wort is advantageously done by combining the still hot wort with water of a substantially lower temperature. This may be done in a continuous as well as a discontinuous fashion, the former being preferred. Typically, the wort from which the organic volatiles have been removed has a temperature in excess of 50° C., preferably in excess of 60° C., most preferably in the range of 70-100° C. when it is diluted.

The diluted wort so obtained can be fermented in a batchwise or continuous manner. According to a particularly preferred embodiment fermentation of the diluted wort is achieved in a continuous fashion by:
  feeding the diluted wort into a propagation vessel in which it is combined with a recirculated stream of yeast-containing residue and in which oxygen is supplied to initiate yeast growth;
  feeding the wort from the propagation vessel into a sequence of one or more fermentation vessels in which the yeast is kept suspended;
  feeding the fermented wort into one or more separators to remove a yeast-containing residue;
  recirculating part of the yeast-containing residue to the propagation vessel; and
  feeding the remainder of the fermented wort to subsequent processing steps.

Typically, the original gravity of the combined streams of diluted wort and yeast-containing residue in the propagation vessel and the one or more fermentation vessels exceeds 12° P. Preferably, said original gravity is within the range of 14-35° P, more preferably within the range of 15-30° P.

In order to ensure that yeast growth occurs in the propagation vessel at a desirable high rate, oxygen must be supplied. This may be done by ensuring that the propagation vessel contains a headspace of air that is in open connection with surrounding atmosphere and by vigorously stirring the fermentation broth. Alternatively, oxygen or air may be introduced into the yeast-containing wort that is contained in the propagation vessel or it may be introduced into the wort stream or the recirculated stream of yeast containing residue prior to entry into the propagation vessel. In both cases the air or oxygen is advantageously distributed throughout the yeast-containing wort. This may be achieved by stirring, recirculation and/or by introducing the oxygen or air through a plurality of gas injectors. According to a particularly preferred embodiment, oxygen is supplied by introducing it into the wort stream prior to entry into the propagation vessel. This embodiment offers the advantage that the oxygen concentration can be controlled accurately. Oxygen is typically introduced in the yeast-containing wort in an amount of at least 8 ppm, preferably in an amount of 10-40 ppm, calculated on the main wort stream.

Typically, the residence time in the propagation vessel is within the range of 0.5-5 hours. The residence time in the propagation vessel can be calculated by dividing the operational volume of the propagation vessel by the wort flow rate towards the process. The operational volume of the propagation vessel equals the total volume of liquid that is contained in the vessel.

The recirculation of the yeast-containing residue in combination with oxygen supply make it possible to maintain high yeast concentrations in the propagation vessel Typically, the yeast content of the wort in the propagation vessel is maintained at more than 20 g/litre (based on wet yeast). According to a particularly preferred embodiment, the yeast concentration of the wort in the propagation vessel is within the range of 30-300 g/l (again based on wet yeast). Even more preferably, the yeast concentration of the wort in the propagation vessels is within the range of 50-200 g/l. The amount of wet yeast contained in a suspension equals the amount of yeast cake with a water content of 73% that may be isolated from the suspension by means of centrifugation. The aforementioned water content includes the water contained in the yeast cells. Advantageously, these yeast concentrations are maintained in the one or more fermentation vessels downstream of the propagation vessel. The use of high yeast concentration offers several important advantages, especially in terms of productivity and cost efficiency.

The present process can be operated at high efficiency by recirculating a large fraction of the yeast-containing residue that is obtained from the separation vessel. According to a preferred embodiment, between 10 and 100%, most preferably between 50 and 100% of the yeast sediment that is removed from the separation vessel is recirculated to the fermentation.

Typically, at least 20%, especially at least 40% of the yeast present in the fermented liquid is recirculated to the propagation vessel. More preferably at least 60% of the yeast present in the fermented liquid is recirculated, most preferably at least 75% of the yeast present in the fermented liquid is recirculated. Usually not more than 98% of the yeast present in the fermented liquid is recirculated.

The temperature of the liquid within the propagation vessel is suitably maintained within the range of 5-40° C., preferably within the range of 6-25° C., more preferably within the range of 8-18° C. The propagation vessel may be operated under super-atmospheric pressure, especially if pressurised air or oxygen is introduced into the vessel. Preferably, the propagation vessel is operated at approximately atmospheric pressure.

In order to maximise efficiency, it should be ensured that the part of the yeast-containing residue that is not recirculated to the propagation vessel has been largely exhausted in that virtually all (green) beer has been removed therefrom. This may advantageously be achieved by washing the yeast contained in the fermented wort and/or the non-recirculated yeast-containing residue.

Typically, at least 20%, especially at least 40% of the yeast present in the fermented wort is removed from the fermented wort before it is subjected to clarification or, if it is not clarified, before it is filled. Preferably, at least 60%, more preferably at least 80%, even more preferably at least 90% and most preferably at least 95% of the yeast present in the fermented wort is removed. Preferably, the yeast is removed by means of sedimentation.

The present method uses one or more fermentation vessels in which the yeast is kept suspended. Preferably, said yeast is not immobilised onto a carrier. The yeast is suitably kept suspended in the fermentation vessels by means of stirring, recirculation and/or carbon dioxide evolution.

Typically, the combined residence time in the one or more fermentation vessels is within the range of 5-80 hours.

The combined residence time in the one or more fermentation vessels can be calculated by adding up the residence times within each of the fermentation vessels. The residence time within a fermentation vessel is calculated by dividing the total operational volume of the fermentation vessel by the wort flow rate to the system.

The temperature of the fermenting wort within the one or more fermentation vessels is suitably maintained within the range of 5-40° C., preferably within the range of 6-25° C., more preferably within the range of 8-18° C. According to a particularly preferred embodiment, the present method employs at least two fermentation vessels. The use of two or more fermentation vessels offers the advantage that higher substrate conversion rates can be achieved in the vessels preceding the last fermentation vessel. Typically, a sequence of not more than 4 fermentation vessels is employed. Most preferably, the present method employs a sequence of 2 or 3 fermentation vessels.

In the present method, the combined residence time in the propagation vessel and the one or more fermentation vessels typically does not exceed 80 hours. According to a preferred embodiment, said combined residence time does not exceed 60 hours. Most preferably, the combined residence time is within the range of 10-50 hours. These relatively short residence times may suitably be achieved by employing relatively high yeast concentrations as described herein before.

Fermentation of the diluted wort can be achieved in a batch-wise fashion by:
feeding the diluted wort into a tank or by feeding the undiluted wort into a tank and diluting it with water;
inoculating the wort with sufficient biologically active yeast; and
fermenting the wort to the desired final attenuation.
The oxygen required for yeast propagation may be provided by introducing oxygen or air into the tank holding the wort or by introducing oxygen or air in the diluted or undiluted wort prior to its introduction into the tank.

Following removal of yeast-containing residue from the fermented wort the green beer so obtained can be subjected to further processing. In the case of production of beer, the further processing preferably includes maturation, cold storage, clarification, carbonation and filling. Preferably, also this further processing is done in a continuous fashion.

Typically, the present method employs a maturation step following the removal of yeast cells from the fermentate. After fermentation, many undesirable flavours and aromas are present in the "green" or immature beer. Maturation (also sometimes referred to as ripening) reduces the levels of these undesirable compounds to produce a more palatable product. Preferably, the maturation step occurs in the present process prior to filtration, more preferably, prior to processing in the one or more separators. Advantageously, maturation is achieved in the present method in a continuous fashion by feeding unmatured beer in the upper part of a vessel. The beer moves downwards and the yeast settles through the beer volume. The yeast is collected in the bottom of the vessel and above the yeast level, the matured beer is removed and fed into cold storage vessels or cooled in the same vessel in which maturation was achieved. The beer remains at a cold temperature for a certain period to allow for coagulation and stabilisation of colloidal particles.

Maturation may also be achieved in a batch process by maturing the immature beer in a maturation vessel or in a fermenter. Following maturation, yeast is preferably removed. Next, the beer is transferred to cold storage tanks for stabilisation or it is cooled in the fermenter or maturation vessel.

Cold storage typically involves maintaining the fermentate at a temperature of less than 10° C., preferably of less than 5° C., more preferably of less than 2° C. for at least 12 hours, preferably for at least 24 hours. According to a preferred embodiments said cold storage is applied after maturation and before filtration.

According to a particularly advantageous embodiment of the method as defined herein before, said method is operated in a fully continuous fashion. Continuous operation of the present method offers a number of significant advantages, including:
higher productivity and lower investment: vessels can be operated for prolonged periods of time under full load, meaning that for equal production volume smaller vessels are needed than in a batch process;
constant and better quality: process is easier to control due to possibility of adapting process parameters to local and instantaneous requirements and because steady-state-conditions are much more stable;
high hygienic standard: continuous process is operated in a closed system.
less energy: energy consumption is evenly spread, without major use peaks;
less labour: operation of continuous process requires less attention
less standstill and cleaning: continuous process can be operated at much longer runlengths than batch processes.

Another aspect of the invention relates to an apparatus for producing a mash extract comprising:
heating unit (3) having an output connected to a
sieving device (4), for receiving a mash slurry, the sieving device having a low solids output (5a) and a high solids output (6) for a stream comprising between 8 wt. % and 25 wt. % of solids connected to a pressing unit (7), the pressing unit (7) having a low solids output (5b) and a high solids output (8) for a stream comprising between 18 wt. % and 40 wt. % of solids a mixing unit (2) having an input for an aqueous liquid and an input for a solid material, said mixing unit (2) having an output connected to the heating unit (3) and wherein the pressing unit (7) has the high solids output (8) connected to a mixing unit (9), which mixing unit (9) also comprises an input (10) for an aqueous liquid, said mixing unit having an output which is connected to a second sieving device (11), which has its high solids output (13) connected to a second pressing unit (14) and wherein the low solids output (12a) of the second sieving device (11) and/or the low solids output (12b) of the second pressing unit (14) is connected to the input of the mixing unit (2).

Yet another aspect of the invention relates to an apparatus for producing a mash extract comprising:

a heating unit (3) having an output connected to a sieving device (4), for receiving a mash slurry, the sieving device having a low solids output (5a) and a high solids output (6) for a stream comprising between 8 wt. % and 25 wt. % solids connected to a mixing unit (22), which mixing unit (22) also comprises an input (23) for an aqueous liquid, said mixing unit (22) having an output which is connected to a sieving device (24) having a low solids output (5c), which has it high solids output (25) connected to pressing unit (7), the pressing unit (7) having a low solids output (5b) and a high solids output (8) for a stream comprising between 18 wt. % and 40 wt. % of solids.

According to a preferred embodiment the latter apparatus comprises a mixing unit (2) having an input for an aqueous liquid and an input for a solid material, said mixing unit (2) having an output connected to the heating unit (3) and wherein the pressing unit (7) has the high solids output (8) connected to a mixing unit (9), which mixing unit (9) also comprises an input (10) for an aqueous liquid, said mixing unit having an output which is connected to a second sieving device (11), which has its high solids output (13) connected to a second pressing unit (14) and wherein the low solids output (12a) of the second sieving device (11) and/or the low solids output (12b) of the second pressing unit (14) is connected to the input of the mixing unit (2).

In a preferred embodiment, the sieving device (4) comprises a vibrating sieving surface. In a particularly preferred embodiment, the vibrating sieving surface comprises a screen or mesh, a vibration member being adapted to oscillate against a downstream side of the sieving surface.

The sieving device (4) advantageously has a pore size of between 20 μm and 1 mm, preferably between 20 μm and 300 μm.

In accordance with another advantageous embodiment of the present apparatus the high solids output (16) of the second pressing unit (14) is connected to a third mixing unit (17), which mixing unit (17) also comprises an input (10) for an aqueous liquid, said mixing unit having an output which is connected to a third sieving device (18), which has its high solids output (20) connected to a third pressing unit (21) and wherein the low solids output (19a) of the third sieving device (18) and/or the low solids output (10b) of the third pressing unit (21) is connected to the input of the mixing unit (9).

Figure 1:
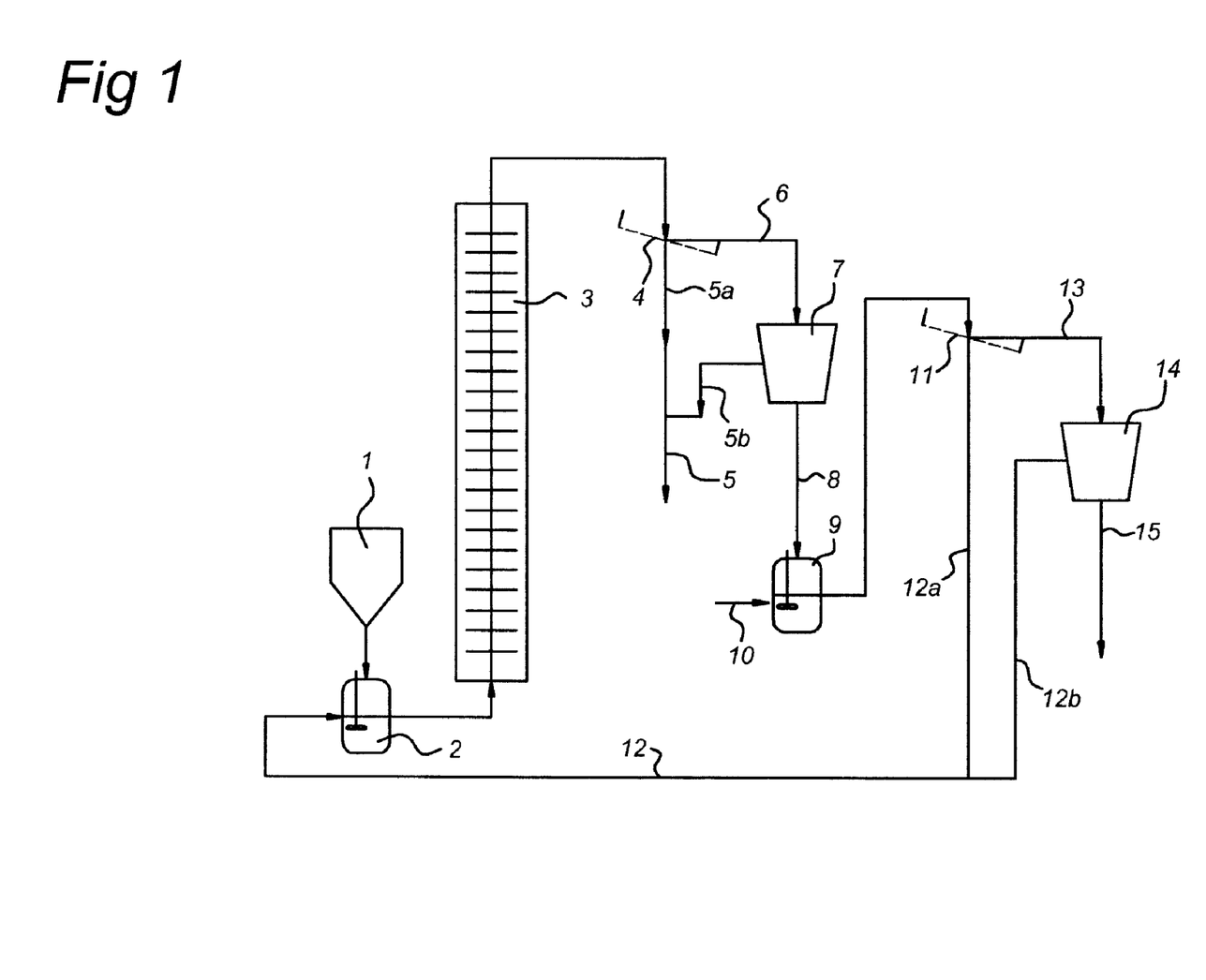
FIG. 1 is a diagram of an apparatus for continuous production of a high gravity mash extract using the method of the present invention, said apparatus employing two sieve-press combinations and a mixing vessel to produce the mash extract.

In the arrangement of the apparatus shown in FIG. 1, ground malt, is continuously fed from hopper 1 into mixing vessel 2, in which the ground malt is thoroughly mixed with the recirculated aqueous stream 12 to produce a mash. The mash is continuously transferred from the mixing vessel 2 to the mashing tower 3 in which the mash is subjected to a heating regime that favours enzymatic degradation of the starch. The heat treated mash is fed from the mashing tower 3 to a first vibrating sieve 4 where it is separated into mash extract 5a and wet spent grain 6. The wet spent grain 6 is continuously transferred to the first screw press 7, in which additional mash extract 5b is removed and dewatered spent grain 8 is expressed. The mash extracts 5a and 5b are combined into a single mash extract stream 5 before being subjected to further processing. The dewatered spent grain 8 obtained from the first screw press 7 is fed to a mixing vessel 9 where it is thoroughly mixed with sparging water 10. The resulting slurry is continuously transferred to a second vibrating sieve 11, where it is separated into wash water 12a and washed spent grain 13. The washed spent grain 13 is continuously transferred to the second screw press 14, in which rest water 12b is removed and spent grain residue 15 is expressed. The wash water 12a and the rest water 12b are combined into a single aqueous stream 12 which is recirculated to mixing vessel 2.

Figure 2:
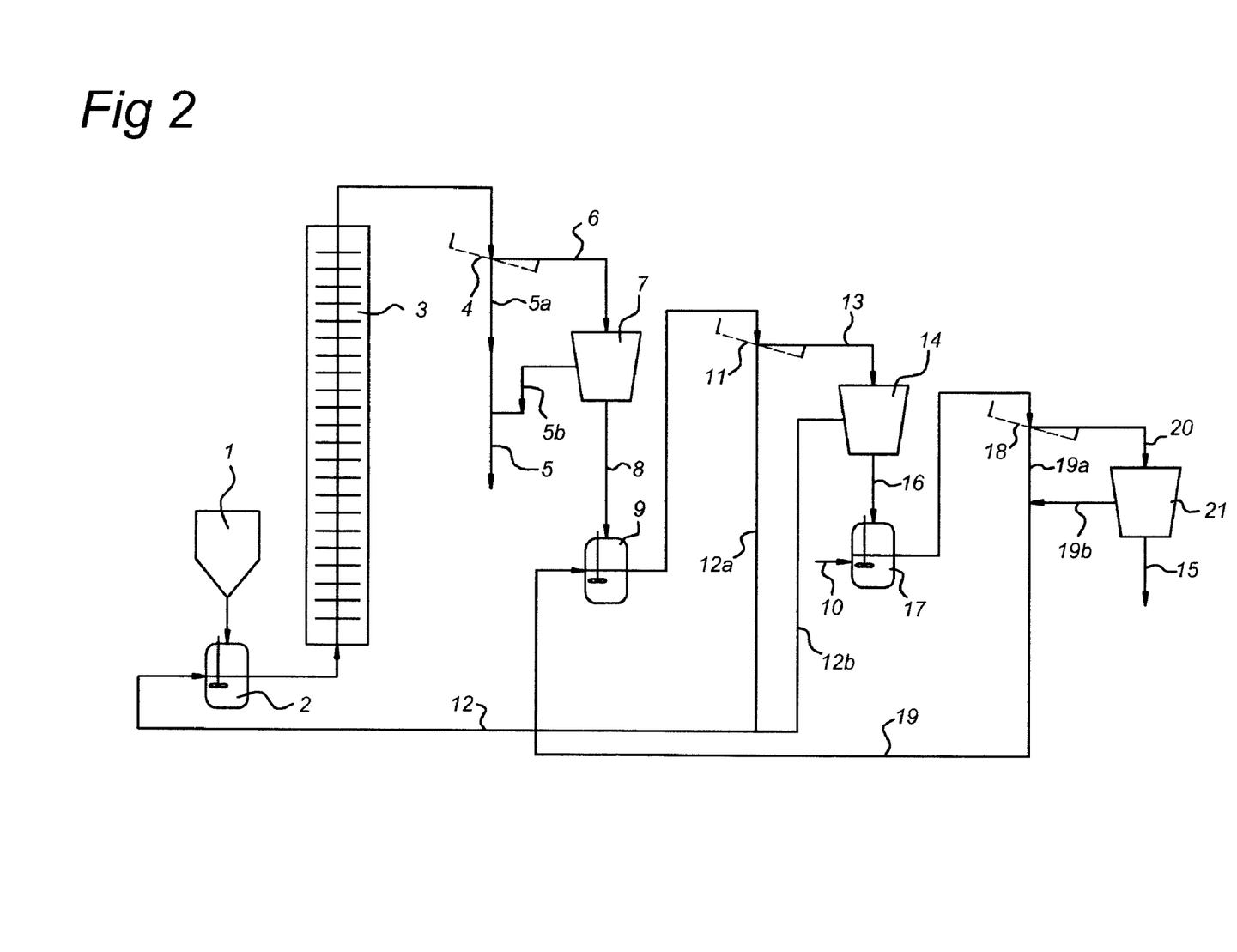
FIG. 2 is a diagram of an apparatus for continuous production of a high gravity mash extract, which apparatus comprises three sieve/press combinations and two mixing vessels.

In the arrangement of the apparatus shown in FIG. 2, ground malt, is continuously fed from hopper 1 into mixing vessel 2, in which the ground malt is thoroughly mixed with the recirculated aqueous stream 12 to produce a mash. The mash is continuously transferred from the mixing vessel 2 to the mashing tower 3 in which the mash is subjected to a heating regime that favours enzymatic degradation of the starch. The heat treated mash is fed from the mashing tower 3 to a first vibrating sieve 4 where it is separated into mash extract 5a and wet spent grain 6. The wet spent grain 6 is continuously transferred to the first screw press 7, in which additional mash extract 5b is removed and dewatered spent grain 8 is expressed. The mash extracts 5a and 5b are combined into a single mash extract stream 5 before being subjected to further processing. The dewatered spent grain 8 obtained from the first screw press 7 is fed to a mixing vessel 9 where it is thoroughly mixed with a recirculated aqueous stream 19. The resulting slurry is continuously transferred to a second vibrating sieve 11, where it is separated into wash water 12a and washed spent grain 13. The washed spent grain 13 is continuously transferred to the second screw press 14, in which additional rest water 12b is removed and spent grain residue 16 is expressed. The wash water 12a and the rest water 12b are combined in a single aqueous stream 12 which is recirculated to mixing vessel 2. The spent grain residue 16 is transferred to a mixing vessel 17 where it is thoroughly mixed with sparging water 10. The resulting slurry is continuously transferred from the mixing vessel 17 to a third vibrating sieve 18, where it is separated into dilute wash water 19a and extracted spent grain 20. The extracted spent grain 20 is continuously transferred to a third screw press 21, in which dilute rest water 19b is removed and exhausted spent grain 15 is expressed. The dilute wash water 19a and dilute rest water 19b are combined in an aqueous stream 19 that is recirculated to mixing vessel 9.

Figure 3:
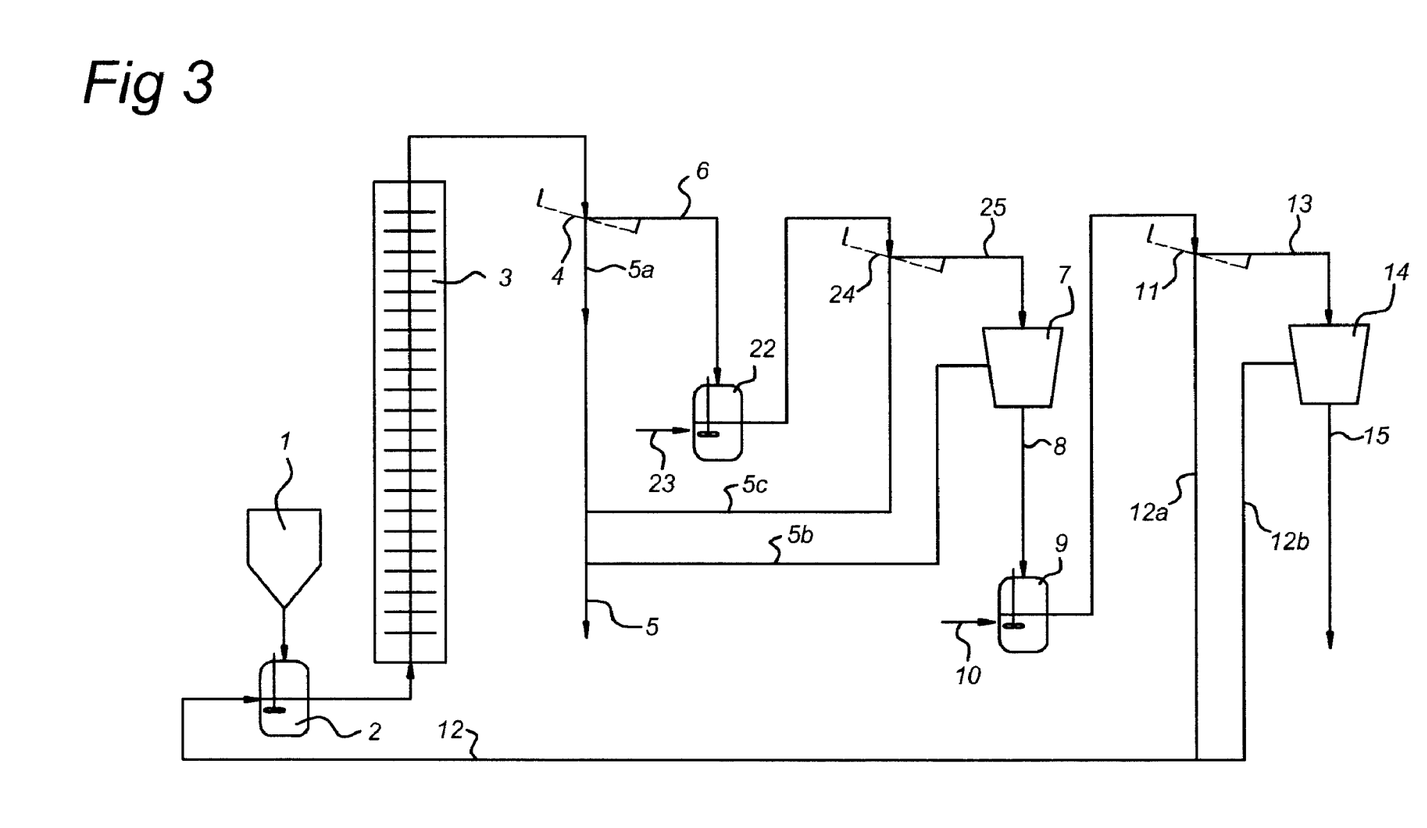
FIG. 3 is a diagram of an apparatus for continuous production of a high gravity mash extract that is largely identical to the apparatus shown in FIG. 1, except that the first sieve-press combination comprises an extra sieve and a sparging vessel.

In the arrangement of the apparatus shown in FIG. 3, ground malt, is continuously fed from hopper 1 into mixing vessel 2, in which the ground malt is thoroughly mixed with the recirculated aqueous stream 12 to produce a mash. The mash is continuously transferred from the mixing vessel 2 to the mashing tower 3 in which the mash is subjected to a heating regime that favours enzymatic degradation of the starch. The heat treated mash is fed from the mashing tower 3 to a first vibrating sieve 4 where it is separated into mash extract 5a and wet spent grain 6. The wet spent grain 6 is continuously transferred to a mixing vessel 22 where it is thoroughly mixed with sparging water 23. The resulting slurry is continuously transferred to a second vibrating sieve 24 where it is separated into wash water 5c and wet spent grain 25. The wet spent grain 25 is continuously transferred to the first screw press 7, in which additional mash extract 5b is removed and dewatered spent grain 8 is expressed. The mash extracts 5a, 5b and the wash water 5c are combined into a single mash extract stream 5 before being subjected to further processing. The dewatered spent grain 8 obtained from the first screw press 7 is fed to a mixing vessel 9 where it is thoroughly mixed with sparging water 10. The resulting slurry is continuously transferred to a third vibrating sieve 11, where it is separated into wash water 12a and washed spent grain 13. The washed spent grain 13 is continuously transferred to the second screw press 14, in which rest water 12b is removed and spent grain residue 15 is expressed. The wash water 12a and the rest water 12b are combined into a single aqueous stream 12 which is recirculated to mixing vessel 2.

The invention is further illustrated by means of the following examples.

EXAMPLES

Example 1

A stream of 960 kg/hr of wort is produced with an extract concentration of 14° P at the end of the wort production process. This wort is fermented, matured and stabilised in batch fermentors and subsequently continuously centrifuged and filtered.

At the front of the process, 455 l/hr of brewing water (50° C.) is continuously mixed with 205 kg/hr hammer milled malt grist (screen size 1.5 mm). Both streams are fed into a continuous stirred tank reactor of 70 liter working volume at a temperature of 58° C. The residence time of this treatment is about 7 min and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231). At certain heights in the column, the mash is heated by direct steam injection and the total reactor is insulated to minimise heat losses. Temperatures are chosen such that the conversion of malt starch to fermentable sugars is appropriate for the product desired. The temperature profile in this example has a first rest at 58° C. for 13. The subsequent saccharification rest at 67° C. has a duration of 80 min and the mash is then heated to a mashing-off temperature of 78° C., at which temperature there is a final rest of 7 min. The mash has a total residence time inside the column of 100 minutes and the resulting mash is fed into the mash separation section. Prior to mash separation, the mash is diluted to an extract concentration of 13.7±1.0° P (95% CI) by addition of hot water at 78° C.

Separation of the malt husks and other solids from the mash is done by a vibrating sieve of the type VTS 1200 supplier by Allgaier Werke GmbH, Uhingen, Germany. This sieve is operated with a 100 µm stainless steel sieve cloth. Beneath the sieve cloth, polymeric balls are impacting the cloth to prevent fouling and clogging of the sieve cloth pores. The sieve separates the particles in the mash into a stream of 24% fines and 76% coarse materials. The fines are suspended in a liquid stream that passes through the pores of the sieve cloth at a flow rate of 1002±15 l/hr. The coarse particles are thickened to a dry matter concentration of 15.8±2.3% (w/w) and still contain a significant amount of extract and water. This liquid content of the retained spent grains is subsequently reduced by feeding the partly dewatered coarse material into a screw press fitted with a 150 µm dewatering section at a flow rate of 193±7 kg/h. A significant amount of liquid is thus removed from the spent grains (41±1.4 kg/h) and the final dry matter concentration in the discharged spent grains is 21.2±3.8% (w/w). The overall extract loss is 14.4%.

The product from the mash separation is now referred to as wort and has a flow rate of approximately 1000 l/hr. Hop extract at a rate of 7 g/hr is dosed continuously in-line and the mixture is heated to a temperature of 103° C. by a heat exchanger fed with steam. The wort is pumped into a plug flow reactor. This column reactor has the same dimensions as the earlier described mashing conversion column and the residence time is 60 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 20 kg/h and at atmospheric conditions at the top of the stripper. The wort leaving the bottom of the stripper is fed into a small buffer with negligible dimensions and directly fed into a centrifuge of the discontinuously discharge type. This machine has a rotational speed of 7400 rpm and a theoretical capacity factor of 13000 m$^2$.

Next, cooling of the wort takes place in two parallel plate and frame wort coolers that lower the wort temperature from 95-100° C. to 8° C. by a two stage water-glycol set-up.

A total volume of 2.2 m$^3$ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to −1.5° C. in 24 hours. This cold phase was maintained for 6 days.

The beer was then filtered over a kieselguhr bright beer filter of the vertical disc type. After this filtration, the beer was stabilised with the usual dosings of PVPP (polyvinylpolypyrrolidone) and the necessary PVPP filtration. Finally, the beer was packaged in suitable containers (glass bottle).

Example 2

A stream of 905 kg/hr of wort is produced with an extract concentration of 16.5° P at the end of the wort production process. This wort is fermented, matured and stabilised in batch fermentors and subsequently continuously centrifuged and filtered.

At the front of the process, 460 l/hr of brewing water (50° C.) is continuously mixed with 206 kg/hr hammer milled malt grist (screen size 1.5 mm). Both streams are fed into a continuous stirred tank reactor of 70 liter working volume at a temperature of 58° C. The residence time of this treatment is about 7 min and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231). At certain heights in the column, the mash is heated by direct steam injection and the total reactor is insulated to minimise heat losses. Temperatures are chosen such that the conversion of malt starch to fermentable sugars is appropriate for the product desired. The temperature profile in this example has a first rest at 58° C. for 13. The subsequent saccharification rest at 67° C. has a duration of 80 min and the mash is then heated to a mashing-off temperature of 78° C., at which temperature there is a final rest of 7 min. The mash has a total residence time inside the column of 100 minutes and the resulting mash is fed into the mash separation section.

Separation of the malt husks and other solids from the mash is done by a vibrating sieve of the type VTS 1200 supplier by Allgaier Werke GmbH, Uhingen, Germany. This sieve is operated with a 100 μm stainless steel sieve cloth. Beneath the sieve cloth, polymeric balls are impacting the cloth to prevent fouling and clogging of the sieve cloth pores. The sieve separates the particles in the mash into a stream of 24% fines and 76% coarse materials. The fines are suspended in a liquid stream that passes through the pores of the sieve cloth at a flow rate of 970 l/hr. The coarse particles are thickened to a dry matter concentration of 16% (w/w) and fed into a mixing tank where the extract concentration is reduced by addition of a stream of 510 l/h of 78° C. brewing water. The product of this mixing tank is again separated by a vibrating sieve (VTS 600) with a 100 μm cloth. The coarse spent grains fraction still contains a significant amount of extract and water. This liquid content of the retained spent grains is subsequently reduced by feeding the partly dewatered coarse material into a screw press fitted with a 150 μm dewatering section at a flow rate of 205 kg/h. A significant amount of liquid is thus removed from the spent grains and the final dry matter concentration in the discharged spent grains is 24% (w/w). The liquid product from the second sieve is recirculated and mixed with the mash stream to obtain a diluted feed stream on the first sieve, thus optimising the extract recovery conditions. The overall extract loss is therefore reduced to 2.6% on the mash separation. The product from the mash separation is now referred to as wort and has a flow rate of 970 l/hr. Hop extract at a rate of 7 g/hr is dosed continuously in-line and the mixture is heated to a temperature of 103° C. by a heat exchanger fed with steam. The wort is pumped into a plug flow reactor. This column reactor has the same dimensions as the earlier described mashing conversion column and the residence time is 65 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 20 kg/h and at atmospheric conditions at the top of the stripper. The wort leaving the bottom of the stripper is fed into a small buffer with negligible dimensions and directly fed into a centrifuge of the discontinuously discharge type. This machine has a rotational speed of 7400 rpm and a theoretical capacity factor of 13000 m². The discharge frequency is regulated by the cake deposit inside the machine.

Next, cooling of the wort takes place in two parallel plate and frame wort coolers that lower the wort temperature from 95-100° C. to 8° C. by a two stage water-glycol set-up.

A total volume of 2.2 m³ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to −1.5° C. in 24 hours. This cold phase was maintained for 6 days.

The beer was then filtered over a kieselguhr bright beer filter of the vertical disc type. After this filtration, the beer was stabilised with the usual dosings of PVPP and the necessary PVPP filtration. Finally, the beer was packaged in suitable containers (glass bottle).

Example 3

A stream of 904 kg/hr of wort is produced with an extract concentration of 16.5° P at the end of the wort production process. This wort is fermented, matured and stabilised in batch fermentors and subsequently continuously centrifuged and filtered.

At the front of the process, 410 l/hr of brewing water (50° C.) is continuously mixed with 205 kg/hr hammer milled malt grist (screen size 1.5 mm). Both streams are fed into a continuous stirred tank reactor of 70 liter working volume at a temperature of 58° C. The residence time of this treatment is about 7 min and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231). At certain heights in the column, the mash is heated by direct steam injection and the total reactor is insulated to minimise heat losses. Temperatures are chosen such that the conversion of malt starch to fermentable sugars is appropriate for the product desired. The temperature profile in this example has a first rest at 58° C. for 13. The subsequent saccharification rest at 67° C. has a duration of 80 min and the mash is then heated to a mashing-off temperature of 78° C., at which temperature there is a final rest of 7 min. The mash has a total residence time inside the column of 100 minutes and the resulting mash is fed into the mash separation section.

Separation of the malt husks and other solids from the mash is done by a vibrating sieve of the type VTS 1200 supplier by Allgaier Werke GmbH, Uhingen, Germany. This sieve is operated with a 100 μm stainless steel sieve cloth. Beneath the sieve cloth, polymeric balls are impacting the cloth to prevent fouling and clogging of the sieve cloth pores. The sieve separates the particles in the mash into a stream of 24% fines and 76% coarse materials. The fines are suspended in a liquid stream that passes through the pores of the sieve cloth at a flow rate of 971 l/hr. The coarse particles are thickened to a dry matter concentration of 16% (w/w) and fed into a screw press where the dry matter content of the spent grains is increased to 21%. The resulting liquid is recirculated onto the abovementioned sieve while the spent grains are fed into a mixing tank where the extract concentration is reduced by addition of a stream of 540 l/hr of 78° C. brewing water. The product of this mixing tank is again separated by a vibrating sieve (VTS 600) with a 100 μm cloth. The coarse spent grains fraction still contains a significant amount of extract and water. This liquid content of the retained spent grains is subsequently reduced by feeding the partly dewatered coarse material into a screw press fitted with a 150 μm dewatering section at a flow rate of 205 kg/h. A significant amount of liquid is thus removed from the spent grains and the final dry matter concentration in the discharged spent grains is 28% (w/w). The liquid product from the second sieve is recirculated and mixed with the mash stream to obtain a diluted feed stream on the first sieve, thus optimising the extract recovery conditions. The overall extract loss is therefore reduced to 1.5% on the mash separation.

The product from the mash separation is now referred to as wort and has a flow rate of 971 l/hr. Hop extract at a rate of 7 g/hr is dosed continuously in-line and the mixture is heated to a temperature of 103° C. by a heat exchanger fed with steam. Next, the wort is pumped into a plug flow reactor. This column reactor has the same dimensions as the earlier described mashing conversion column and the residence time is 65 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 20 kg/h and at atmospheric conditions at the top of the stripper. The wort leaving the bottom of the stripper is fed into a small buffer with negligible dimensions and directly fed into a centrifuge of the discontinuously discharge type. This machine has a rotational speed of 7400 rpm and a theoretical capacity factor of 13000 $m^2$. The discharge frequency is regulated by the cake deposit inside the machine.

Next, cooling of the wort takes place in two parallel plate and frame wort coolers that lower the wort temperature from 95-100° C. to 8° C. by a two stage water-glycol set-up.

A total volume of 2.2 $m^3$ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to −1.5° C. in 24 hours. This cold phase was maintained for 6 days.

The beer was then filtered over a kieselguhr bright beer filter of the vertical disc type. After this filtration, the beer was stabilised with the usual dosings of PVPP and the necessary PVPP filtration. Finally, the beer was packaged in suitable containers (glass bottle).

The invention claimed is:

1. A method of producing a mash extract comprising, sequentially:
(a) mashing particulate, starch-containing and optionally malted grains with water;
(b) heating the mash and enzymatically hydrolysing the starch;
(c) passing the heated mash across a first sieve for separation into fermentable mash extract and wet spent grain;
(d) optionally (i) transferring the wet spent grain into a washing vessel and mixing it with sparging water to produce a slurry; and (ii) passing the slurry across another sieve for separation into wet spent grain and wash water;
(e) transferring the wet spent grain to a first press and pressing the wet spent grain to obtain dewatered spent grain and additional fermentable mash extract;
(f) transferring the dewatered spent grain into a first mixing vessel and mixing the dewatered spent grain with sparging water to produce a first slurry;
(g) passing the all of the first slurry across a second sieve for separation into washed spent grain and wash water; and
(h) transferring the washed spent grain to a second press and pressing the washed spent grain to obtain spent grain residue and rest water;
(i) transferrin the spent grain residue obtained from the second press into a second mixing vessel and mixing it with sparging water to produce a second slurry;
(j) passing second slurry across a third sieve for separation into extracted spent grain and dilute wash water;
(k) transferring the extracted spent grain to a third press and pressing said extracted spent grain to obtain exhausted spent grain residue and dilute rest water;
wherein at least a part of the wash water and/or the rest water is recirculated to the mashing step (a) and/or combined with the heat-treated mash before it is passed across the first sieve, and
wherein at least a part of the dilute wash water and/or the dilute rest water is recirculated to the first mixing vessel.

2. The method according to claim 1, further comprising:
(i) transferring the wet spent grain into a washing vessel and mixing the wet spent grain with sparging water to produce a slurry; and
(ii) passing the slurry across a sieve for separation into spent grain and wash water.

3. The method according to claim 1, wherein both the wash water and the rest water are fully recirculated to step (a) and/or combined with the heated mash prior to step (c).

4. The method according to claim 1, wherein the wash water and/or the rest water are recirculated to the mashing step a.

5. The method according to claim 1, wherein the total amount of recirculated wash water and rest water constitutes at least 80 wt. % of the total amount of water employed in the mashing step.

6. The method according to claim 5, wherein the total amount of recirculated wash water and rest water constitutes at least 90 wt. % of the total amount of water employed in the mashing step.

7. The method according to claim 1, wherein the fermentable mash extract obtained from the first sieve has a gravity that exceeds 15° P.

8. The method according to claim 1, wherein steps (c) to (h) are carried out in a continuous fashion.

9. The method according to claim 1, wherein the sieves are vibrating sieves.

10. The method according to claim 1, wherein the presses are screw presses.

11. The method according to claim 1, wherein the mash extract produced has an extract loss of less than 15 wt. %.

12. The method according to claim 11, wherein the mash extract produced has an extract loss of less than 3 wt. %.

13. The method according to claim 1, further comprising:
(l) converting the mashed extract into wort by heating the mash extract to a temperature of at least 60° C. for at least 15 minutes; and
(m) removing organic volatiles from the hot wort made in step (l) by reducing pressure and/or by stripping the wort with a gas or steam; wherein the mash extract has a gravity maintained at 15° P or more during steps (l) and (m).

14. The method according to claim 13, wherein the mash extract has a gravity maintained at 18° P or more.

15. The method according to claim 14, wherein the mash extract has a gravity maintained at 20° P or more.

16. The method according to claim 13, wherein, following the removal of organic volatiles, the wort is diluted prior to a gravity within the range of 10-25° P prior to yeast fermentation.

17. The method according to claim 1, wherein said method is operated in a fully continuous fashion.

* * * * *